United States Patent
Trawick

(10) Patent No.: US 11,411,514 B2
(45) Date of Patent: Aug. 9, 2022

(54) ELECTRIC MACHINE WITH TORQUE CONTROL

(71) Applicant: Rolls-Royce Corporation, Indianapolis, IN (US)

(72) Inventor: David Russell Trawick, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 197 days.

(21) Appl. No.: 16/570,616

(22) Filed: Sep. 13, 2019

(65) Prior Publication Data

US 2021/0083605 A1    Mar. 18, 2021

(51) Int. Cl.
*H02P 6/10*    (2006.01)

(52) U.S. Cl.
CPC ..................................... *H02P 6/10* (2013.01)

(58) Field of Classification Search
CPC ......................................................... H02P 6/10
See application file for complete search history.

(56) References Cited

U.S. PATENT DOCUMENTS

| | | | |
|---|---|---|---|
| 4,931,949 A | 6/1990 | Hernandez et al. | |
| 5,113,720 A | 5/1992 | Asayama et al. | |
| 5,209,141 A | 5/1993 | Asayama et al. | |
| 5,523,701 A | 6/1996 | Smith et al. | |
| 6,347,548 B1 | 2/2002 | Powrie | |
| 6,507,789 B1 | 1/2003 | Reddy et al. | |
| 6,526,356 B1 | 2/2003 | DiMaggio et al. | |
| 7,013,210 B2 | 3/2006 | McBrien et al. | |
| 7,154,236 B1 | 12/2006 | Heap | |
| 7,195,211 B2 | 3/2007 | Kande et al. | |

(Continued)

FOREIGN PATENT DOCUMENTS

| CN | 108357490 A | 8/2018 |
|---|---|---|
| DE | 112015001522 T5 | 3/2017 |

(Continued)

OTHER PUBLICATIONS

Lewicki et al., "Detection and Compensation of Torque Harmonics in Drive with Induction Motor and Gear," Zeszyty Problemowe—Maszyny Elektryczne Nr 80/2008, 2008 ( (Applicant points out, in accordance with MPEP 609.04(a), that the year of publication, 2008, is sufficiently earlier than the effective U.S. filing date, so that the particular month of publication is not in issue.) 5 pp.

(Continued)

*Primary Examiner* — Zoheb S Imtiaz
(74) *Attorney, Agent, or Firm* — Shumaker & Sieffert, P.A.

(57) ABSTRACT

A system for control of a torque developed by an electric machine, based on a rotary position of a rotary component. The rotation of the rotary component is dependent on a rotation of a rotary shaft of the electric machine. The system utilizes a rotary position sensor to detect specific positions of the rotary component and allows altering the torque of the electric machine based on the specific rotary positions. The system allows altering the torque when a specific gear tooth of a downstream or upstream gear is in a contact position with another meshing component. The electric machine may be configured to operate as an electric motor driving a gearbox or an electric generator driven by a gearbox.

19 Claims, 4 Drawing Sheets

(56) References Cited

U.S. PATENT DOCUMENTS

| | | |
|---|---|---|
| 7,537,542 B2 | 5/2009 | Cawthorne et al. |
| 7,650,210 B2 | 1/2010 | Breed |
| 7,739,016 B2 | 6/2010 | Morris |
| 8,019,501 B2 | 9/2011 | Breed |
| 8,165,737 B2 | 4/2012 | Schulz et al. |
| 8,417,427 B2 | 4/2013 | Stridsberg |
| 8,965,616 B2 | 2/2015 | Gibson et al. |
| 9,748,886 B1* | 8/2017 | McDonald ............. B63H 21/14 |
| 10,132,701 B2 | 11/2018 | Urata |
| 2004/0080291 A1 | 4/2004 | Inoue et al. |
| 2011/0031425 A1* | 2/2011 | Tyler ..................... F16K 31/046 |
| | | 251/129.11 |
| 2012/0001105 A1* | 1/2012 | Hayashi ................. F02B 31/06 |
| | | 251/129.01 |
| 2012/0025526 A1 | 2/2012 | Luo et al. |
| 2014/0277879 A1 | 9/2014 | Sheidler et al. |
| 2015/0330867 A1* | 11/2015 | Potts ................... G01M 13/028 |
| | | 73/593 |
| 2016/0043671 A1* | 2/2016 | Kemp ................. H02P 21/0085 |
| | | 318/400.14 |
| 2017/0144703 A1 | 5/2017 | Farrelly |
| 2018/0209534 A1 | 7/2018 | Takeuchi |
| 2019/0229667 A1* | 7/2019 | Nakaoka ................. H02P 25/22 |

FOREIGN PATENT DOCUMENTS

| | | |
|---|---|---|
| EP | 2502174 B1 | 6/2018 |
| JP | 2016111761 A | 6/2016 |
| WO | 2014098008 A1 | 6/2014 |
| WO | 2015146445 A1 | 10/2015 |

OTHER PUBLICATIONS

Kannan et al., "Torque Ripple Compensation Technique Based BLDC Motors using Cuk Converter using Arduino," International Journal of Current Trends in Engineering & Research (IJCTER), e-ISSN 2455-1392,vol. 2, No. 5, May 2016, pp. 1-11.

Response to Office Action dated Oct. 6, 2021, from counterpart French Application No. 2009207 filed Jan. 6, 2022, 41 pp.

Office Action, including translation from FR Application No. FR2009207 dated Oct. 5, 2021, 14 pgs.

\* cited by examiner

ELECTRIC MACHINE WITH TORQUE CONTROL

TECHNICAL FIELD

The disclosure relates to torque control in an electric machine.

BACKGROUND

One method to transmit rotary torque from a prime mover to an electrical generator or from an electric motor to a mechanical load utilizes gearboxes for speed matching. This allows the respective machines to operate at differing speeds, so that each machine may operate in a more efficient manner. Both the machines generating and receiving the torque, as well as rotating components in the gearbox, are rotationally coupled and responsible for transmitting the torque from one component to the other. Certain rotary components such as toothed gears in the gearbox may transmit the torque via meshing with another gear, and consequently the toothed gear may bear the torque on only one or a few of the gear teeth at a time. This concentration of the torque on only one or more gear teeth in the contact position can result in undesired vibrations and/or stress concentrations on certain gear teeth which may be damaged or otherwise abnormal, compared to the other gear teeth comprising the gear.

SUMMARY

In general, the disclosure describes a system for control of a torque developed by an electric machine based on a rotary position of a rotary component, such as an output or input shaft of the electric machine, a shaft configured to rotate in proportion to the electric machine, or a component such as a gear in a gearbox driving or being driven by the electric machine. The system allows altering the torque of the electric machine to accommodate rotationally coupled components transmitting the torque, when a specific rotationally coupled component may benefit from an induced torque ripple. For example, the system allows altering a torque or counter-torque produced by an electric machine when a specific gear tooth of a downstream or upstream gear is in a contact position with another meshing component. The specific gear tooth may be, for example, an abnormal gear tooth displaying signs or abnormal wear or fatigue as compared to other gear teeth on a gear.

The system comprises an electric machine having a rotary shaft, a field winding, and a control circuit. The rotary shaft is configured to generate a torque based on a field generated by the field winding. For example, the field winding may be in a stator of the electric machine, and the rotary shaft may be configured to generate a torque based on interaction with a stator field emanating at least in part from the field winding. The field winding may be in a rotor mechanically coupled to the rotary shaft, and the rotary shaft may be configured to generate the torque based on interaction with a stator field. The electric machine may be configured to operate as an electric motor, an electric generator, or both, and the torque may be a motor torque or a generator counter-torque. The control circuit is configured to control an electrical parameter of the field winding such as a current, a voltage, or a current and a voltage, and thereby influence the torque generated by the rotary shaft.

The system further comprises a rotary position sensor configured to sense a rotary position of a rotary component, where the rotation of the rotary component is dependent on the rotation of the rotary shaft of the electric machine. For example, the rotary component may comprise a gearbox (e.g., may be a gear or shaft within the gearbox) rotationally coupled to and driven by the rotary shaft of the electric machine as the electric machine operates as an electric motor, such that the rotary component experiences rotation based on the rotary shaft of the electric machine. The rotary component may comprise a gearbox (e.g., may be a gear or shaft within the gearbox) rotationally coupled to and driving the rotary shaft of the electric machine as the electric machine operates as an electric generator, such that the rotation of the rotary component is proportional to the rotation of the rotary shaft of the electric machine.

The system further comprises a controller, with the controller configured to receive a signal indicative of a rotary position of the rotary component, and configured to direct the control circuit of the electric machine to alter the electrical parameter of the field winding when the controller recognizes one or more specific rotary positions using the indicative signal from the rotary position sensor. In examples, the controller correlates the contact position of a specific gear tooth of a gear with the signal indicative of the rotary position of the rotating component, in order to determine the one or more specific rotary positions where the electrical parameter of the field is altered. This may allow alteration of a torque borne by the specific gear tooth as the specific gear tooth passes through the contact position.

The details of one or more examples are set forth in the accompanying drawings and the description below. Other features, objects, and advantages will be apparent from the description and drawings, and from the claims.

DETAILED DESCRIPTION

Figure 1:
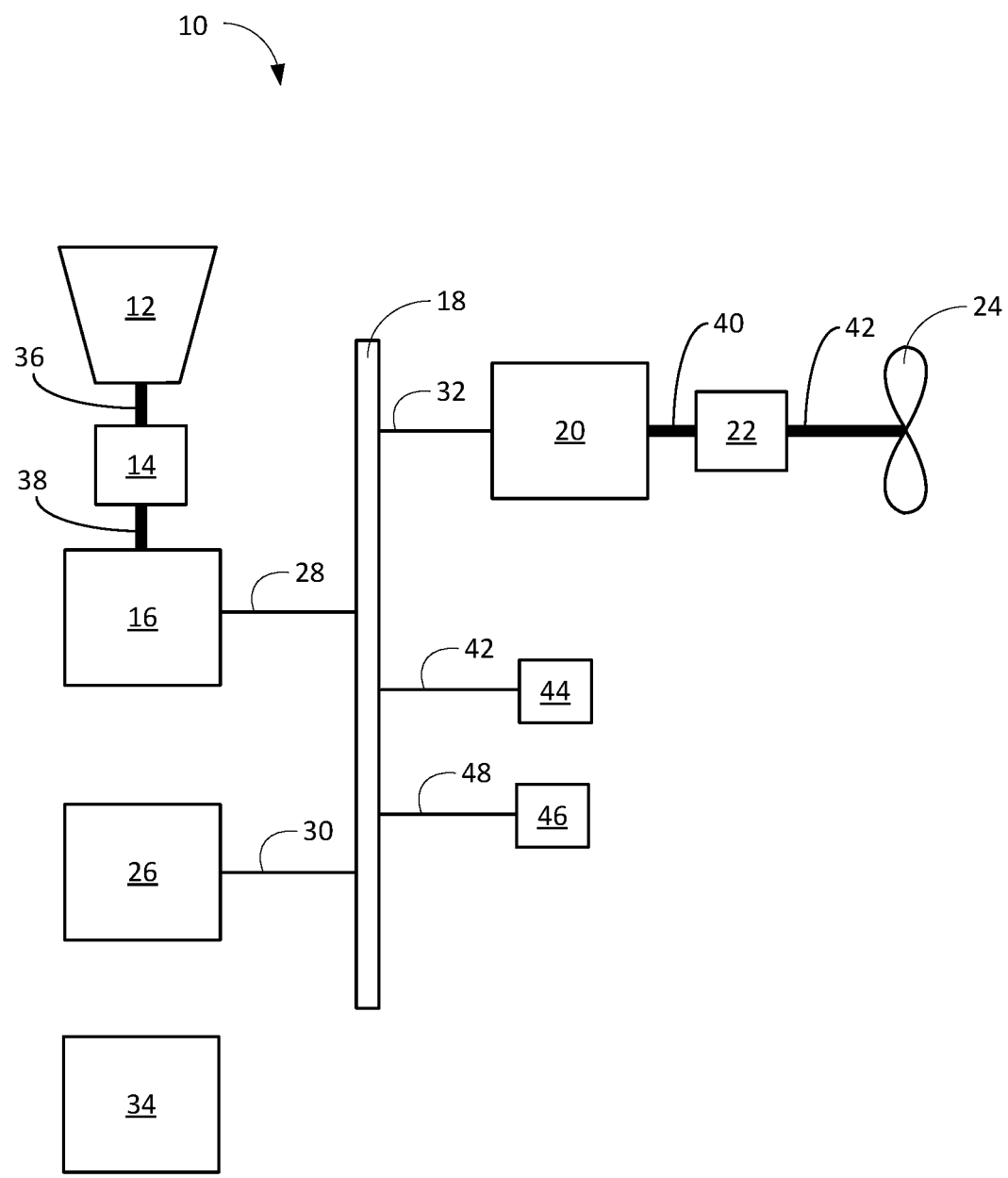
FIG. 1 is a block diagram illustrating an example distribution system comprising generating and motoring components mechanically coupled to gearboxes.

The disclosure describes a system for control of a torque developed by an electric machine based on a rotary position of a rotary component, such as an output or input shaft of the electric machine, a shaft configured to rotate in proportion to the electric machine, or a component such as a gear in a gearbox driving or driven by the electric machine. A rotary position sensor is configured to report one or more positions of the rotary component to a controller, and the controller is configured to direct a control circuit comprising the electric machine to alter a torque generated by a rotary shaft of the electric machine when the rotary component achieves one or more rotary positions. The system allows altering the torque of an electric machine to accommodate proportionally rotating components that may benefit from an induced torque ripple of the electric machine. For example, the system allows altering a torque or counter-torque produced by an electric machine when a specific gear tooth such as a generally abnormal gear tooth of a downstream or upstream gear is in a contact position with another meshing component.

The electric machine may be operating as a motor or generator, and the torque generated by the rotary shaft of the machine may be a motor torque or a counter-torque. The rotary component achieving the one or more rotary positions is configured to rotate in proportion with the rotary shaft of the electric machine. For example, the rotary component may be a shaft or gear in a gearbox mechanically coupled to the rotary shaft of the electric machine, with each rotation of the rotary shaft of the electric machine driving corresponding rotations of an input shaft of the gearbox, an output shaft of the gearbox, and various meshing gears within the gearbox. Similarly, the rotary component may be a shaft or a gear in a gearbox driving the electric machine and mechanically coupled to the electric machine such that each rotation of the electric machine's rotary shaft results from a corresponding rotation of the driving shaft or gear.

The electric machine may include a control circuit controlling one or more electric parameters of a field winding of the electric machine. The field winding generates some portion of a rotor or a stator electric field in response to the one or more electrical parameters, and the rotary shaft of the electric machine is configured to interact with the field and generate a torque. This allows the control circuit controlling the one or more electrical parameters of the field winding to alter the torque generated by the electric machine. The controller of the system may be configured to communicate with the control circuit of the electric machine and with the rotary position sensor detecting the rotary position of the rotary component within the system, so that the controller may direct the control circuit to alter the one or more electrical parameters provided to the field winding when the rotary component achieves a specific rotary position. This allows the torque of the electric machine (motor torque or counter-torque) to be adjusted when specific positions of the rotary component are achieved.

As an example, the rotary component may be a particular meshing gear in a gearbox driven by the electric machine acting as a motor, with the system configured such that the gear rotates in proportion with the rotary shaft of the electric machine. The rotary position sensor may be configured to report the rotational position of the particular gear to the controller. Based on the rotational position of the particular gear, the controller may direct the control circuit of the electric machine to alter the torque generated by the rotary shaft of the electric machine, and thereby alter the torque passed to and transmitted through the particular gear when the particular gear assumes a specific rotary position. For example, the controller may direct the control circuit to momentarily reduce the torque generated by the rotary shaft of the electric machine when the specific gear assumes a contact position where a specific gear tooth (such as a generally abnormal gear tooth) of the specific gear becomes responsible for transmitting the torque further along a gear train. The controller may direct the control circuit of the electric machine to reduce the generated torque as the specific gear tooth passes through the contact position, then direct the control circuit to increase the torque back to a previous running torque once the rotary position sensor reports a position of the specific gear indicating that the specific gear tooth is no longer in a contact position.

Alternately, rather than the rotary component being the specific meshing gear, the rotary component may be, for example, a shaft configured in the system to rotate in proportion to the particular meshing gear. The controller may similarly direct the control system to reduce a generated torque as a specific gear tooth of the specific meshing gear passes through a contact position, however in this case the controller may recognize when the contact position is occurring based on the rotary position of the rotary component (e.g., the shaft), rather than directly from the specific meshing gear itself. For example, the specific meshing gear may be a meshing gear in a gearbox, where a specific rotary position of each meshing gear in the gearbox may be determined based on a rotary position of an input shaft driving a wheel work of the gearbox. The controller may be configured to recognize when a decrease in torque might be indicated based on the rotation of any rotary component whose rotational position may be correlated to the specific meshing gear.

In some examples, the electric machine may be a generator receiving a torque from a gearbox comprising the specific meshing gear. The gearbox may transmit a driving torque to the rotary shaft of the electric generator, and the electric generator may generate a counter-torque as electrical power is generated and provided to an electrical bus. The counter-torque may be transmitted to the gearbox through the rotary shaft of the electrical generator, and hence to the specific meshing gear comprising the gearbox. With the controller receiving a rotary position of a rotary component, and the rotary position of the rotary component indicative of the rotary position of the specific meshing gear comprising the gearbox, the controller may, for example, direct the control circuit of the electric generator to increase the counter-torque when a specific gear tooth of the specific gear assumes a contact position, in order to allow the specific gear tooth to pass through the contact position under a reduced torque condition.

Providing a system whereby the torque of an electric machine may be altered based on a rotary position of a rotary component allows the system to accommodate proportionally rotary components throughout the system that may benefit from an induced torque ripple of the electric machine. Additionally, basing the alteration of the torque on a rotary component in such a proportionally rotating system allows detection and response to a sensed abnormality without requiring specific knowledge of the rotary component responsible. For example, an abnormal vibration of a proportionally rotating system may be an indication that some rotary component within the system is cyclically experiencing an abnormal load response. In the system disclosed herein, the abnormal vibration may be correlated to the rotation of, for example, the rotary shaft of the electric machine or some other proportionally rotary component, and the controller may alter the torque of the electric machine based solely on the correlation, without detailed knowledge of which specific rotary component may be responsible.

The system may be utilized in distribution systems where an electrical machine operating as a motor transmits mechanical torque to drive a gearbox. The system may be utilized in distribution systems where an electrical machine operating as a generator is driven by mechanical torque transmitted through a meshing gearbox. The system may also be utilized in distribution systems comprising electrical generators driven by gearbox transmitted torque and producing a counter-torque, and in distribution systems comprising electric motors generating motor torque in order to drive a gearbox.

As an example, FIG. 1 is a block diagram illustrating an example distribution system 10 comprising generating and motoring components mechanically coupled to gearboxes comprising proportionally rotary components, such as shafts and gears. System 10 comprises a prime mover 12 configured to produce mechanical power and transmit the mechanical power over shaft 36. Prime mover 12 may be any device configured to provide mechanical power over an output shaft such as shaft 36. For example, prime mover 12 may be an engine which converts heat or fluid energy into mechanical power, such as a gas turbine, a diesel engine, or an air or hydraulically driven motor.

Shaft 36 is mechanically coupled to a wheel work of a gearbox 14. Gearbox 14 houses a meshing gear train. Gearbox 14 is configured to receive an input torque on the wheel work at an input rotary speed and input rotary direction and drive the meshing gear train in order to generate an output torque at an output rotary speed and an output rotary direction. Gearbox 14 generally comprises toothed gears which mesh with other toothed parts in the gearbox to transmit torque. Gearbox 14 may be a step-up gearbox configured to generate an output rotary speed greater than the input rotary speed, or may be step-down gearbox configured to generate an output rotary speed less than the input rotary speed. The gear train comprising gearbox 14 may have any overall gear ratio, and gearbox 14 may have any torque ratio. At FIG. 1, gearbox 14 generates the output torque at the output rotary speed on shaft 38.

Shaft 38 is mechanically coupled to electric generator 16. Electric generator 16 may comprise a rotor and a stator, and be configured to accept a torque on the rotor and generate electrical power from the stator. Alternately, electric generator 16 may accept a torque on the rotor and generate electrical power from the rotor. In FIG. 1, electric generator 16 provides electrical power to bus 18 via electrical lead 28. Electric generator 16 may be an Alternating Current (AC) or Direct Current (DC) generator. In some examples, electric generator 16 utilizes a static rotor field to prompt an AC current and voltage in a stator, which is subsequently rectified to provide a DC output. In some examples, electric generator 16 utilizes a static stator field to prompt a current and voltage on the rotor, which is commutated to provide a DC output. Electric generator 16 may utilize a plurality of permanent magnets in order to prompt the current and voltage.

An arrangement such as that depicted among prime mover 16, gearbox 14, and electric generator 16 may be utilized when requirements or preference dictate that prime mover 12 and electric generator 16 operate at different speeds. For example, prime mover 16 may be a gas turbine operating most efficiently at speeds of about 30,000 RPM while electric generator 16 may be a DC generator operating most efficiently at speeds of about 10,000 RPM. Gearbox 14 may be configured to operate as an intermediary between the two components, so that gearbox 14 accepts higher speed torque from prime mover 16 and transmits a lower speed torque to electrical generator 16. This allows a combined operation where prime mover 12 provides mechanical power to electric generator 16 for the generation of electrical power, while both prime mover 12 and electrical machine 16 operate simultaneously at their differing but more efficient speeds. This may increase the overall efficiency of the power generating activity. Similarly, gearbox 14 might be utilized when prime mover 12 operates most efficiently at speeds lower than electric machine 16.

The transmission of torque from prime mover 12, through shaft 36, through gearbox 14, and through shaft 38 to electric generator 16, combined with the mechanical coupling between shaft 36, gearbox 14, shaft 38, and electric generator 16, results in a series of components rotating in proportion to the rotor of electric generator 16. For example, gearbox 16 may provide multiple meshing gears and connecting shafts in order to step down or step up the speed of a delivered torque, with each component rotationally coupled to the rotation of all the other meshing gears in the gearbox, as well as rotationally coupled to the rotation of shaft 36, shaft 38, and the rotor of electric generator 16. The rotational coupling provides a proportional relationship between each rotary component based on, for example, the various gear ratios within gearbox 14.

This proportional relationship between rotationally coupled components allows the rotational position of any rotationally coupled component to be determined based on a rotational position of any other rotationally coupled component. For example, with a position of shaft 38 known, the rotational position of a specific meshing gear in gearbox 14 may be determined using the proportional relationship between the specific gear and shaft 38. Similarly, with the position of the rotor of electric generator 16 known, the rotational position of a specific meshing gear in gearbox 14 may be determined using the proportional relationship between the specific gear and the rotor of electric generator 16. Consequently, for any component within the rotationally coupled components transmitting a torque from prime mover 12 to electric generator 16, a rotary position of the component may be ascertained from the rotary position of any of the rotationally coupled components. As a result, a rotary position sensor indicating a rotary position of any of the rotationally coupled components may be sufficient to anticipate the rotary position of every other rotationally coupled component transmitting the torque.

Additionally, the torque transmitted through, for example, the individual rotationally coupled components of gearbox 14, may be impacted by the counter-torque generated by generator 16. As the rotationally coupled components transmit the torque from prime mover 12 to electric generator 16, each of the rotationally coupled components bears at least some portion of the transmitted torque. At the same time, as electric generator 16 accepts a torque on the rotor and provides electrical power to bus 18, electric generator 16 develops a counter-torque acting in opposition to the torque provided via gearbox 14 and shaft 38. Consequently, a system whereby the counter-torque of electric generator 16 may be altered based on a rotary position of a rotary component may allow the accommodation of a proportionally rotating component, when the proportionally rotating component might benefit from an induced torque ripple of the electric machine. For example, the counter-torque of generator 16 might be intentionally and momentarily increased when a specific gear tooth (such as a generally abnormal gear tooth) of an individual gear within gearbox 14 is indicated as being in a contact position, in order to reduce the load borne by the specific gear tooth. Once the specific gear tooth has passed through the contact position, the counter-torque may be allowed to return to its previous level, based for example on the electrical load of electric generator 16.

Bus 18 may receive electrical power from electric generator 16 and provide the electrical power to other components within distribution system 10. For example, bus 18 may provide power to electric motor 20 via electrical lead 32.

Electric motor 20 comprises a rotor and a stator, and may be configured to accept electrical power and provide a rotating electric field on the stator to generate a torque on the rotor. Alternately, electric motor may be configured to provide a rotating or commutated field on the rotor in order to generate the torque. In an example, electric motor 20 is a DC motor configured to accept DC power, and bus 18 provides DC power to electric motor 20. Electric motor may be a brushless DC (BLDC) motor configured to accept a DC power input and generate a rotating field on its stator through electronic commutation. Electric motor 20 may utilize a plurality of permanent magnets on the rotor in order to prompt rotor torque in response to the rotating stator field. Electric motor 20 is configured to produce mechanical power and transmit the mechanical power over shaft 40.

Shaft 40 is mechanically coupled to a wheel work of a gearbox 22 housing a meshing gear train configured to transmit torque. Gearbox 22 is configured to receive an input torque at an input rotary speed and input rotary direction and drive the meshing gear train in order to generate an output torque at an output rotary speed and an output rotary direction. Gearbox 22 may be a step-up gearbox or step-down gearbox, and the gear train comprising gearbox 22 may have any overall gear ratio. Gearbox 22 may have any torque ratio. At FIG. 1, electric motor 20 provides an input torque at an input rotary speed to gearbox 22 via shaft 40, and gearbox 22 generates an output torque at an output rotary speed on shaft 42.

Shaft 40 is mechanically coupled to a mechanical load 24. Mechanical load 24 may be any device or system which utilizes mechanical power delivered by a rotary shaft. Mechanical load 24 may be, for example, a propulsor, a propeller, an auxiliary load such as a pump or compressor, or any other device or component configured to make use of a mechanical torque.

An arrangement such as that depicted among electric motor 20, gearbox 22, and mechanical load 24 may be utilized when requirements or preference dictate that electric motor 20 and mechanical load 24 operate at differing speeds. For example, electric motor 20 may be motor which most efficiently over a range of speeds generally about 10,000 RPM, while mechanical load 24 might require speeds one or more orders of magnitude lower. Gearbox 22 may be configured to operate as an intermediary between the two components, so that gearbox 22 accepts higher speed torque from electric motor 20 and transmits a lower speed torque to mechanical load 24. This allows a combined operation where electric motor 20 may provide mechanical power to mechanical load 24 at a speed required by mechanical load 24, while electrical motor 20 simultaneously operates at significantly higher but more efficient speed. This may increase the overall efficiency of the power transmission activity. Similarly, gearbox 22 might be utilized when electric motor 20 operates more efficiently at speeds lower than that generally required by mechanical load 24.

The transmissions of torque from electric motor 20, through shaft 40, through gearbox 22, and through shaft 42 to mechanical load 24, combined with the mechanical coupling between shaft 40, gearbox 22, and shaft 42, results in a series of components rotating in proportion to a rotating output shaft of electric motor 20. Consequently, for any component within the rotationally coupled components transmitting a torque from electric motor 20 to mechanical load 24, a rotary position of the component may be ascertained from the rotary position of any of the rotationally coupled components, and a rotary position sensor indicating a rotary position of any of the rotationally coupled components is sufficient to anticipate the rotary position of every other rotationally coupled component transmitting the torque. Thus, a system whereby the torque of electric motor generator 16 may be altered based on a rotary position of a rotary component may allow the accommodation of a proportionally rotating component, when the proportionally rotating component might benefit from an induced torque ripple of electric motor 20. For example, the torque of electric motor 20 might be intentionally and momentarily decreased when a specific gear tooth of an individual gear within gearbox 22 is indicated as being in a contact position, in order to reduce the load borne by the specific gear tooth. Once the specific gear tooth has passed through the contact position, the torque may be increased to its previous level, based on the demands of mechanical load 24.

Distribution system 10 may include other components, such as an energy storage system (ESS) 30. ESS 30 may comprise components such as a battery, capacitor bank, or other components configured to exchange power (e.g., receive or deliver) with bus 18 via electrical lead 30. Distribution system 10 may also include one or more additional electrical loads 44 receiving electrical power from bus 18 via, for example, electrical lead 42, and one or more additional electrical power sources 46 providing power to bus 18 via, for example, electrical lead 48. Electrical loads 44 may be any electrical loads, such as auxiliary components, hotel loads, additional electric motors configured similarly to electric motor 22, or any component which relies of electrical power for operation. Electrical power sources 46 may be any electrical power generation source, including additional generators mechanically motivated in any manner, additional generators configured similarly to electric generator 16, or any other power source. Distribution system 34 may also include a distribution controller 34 configured to coordinate energy generation, provision, and consumption among the components of energy distribution system 10.

Figure 2:
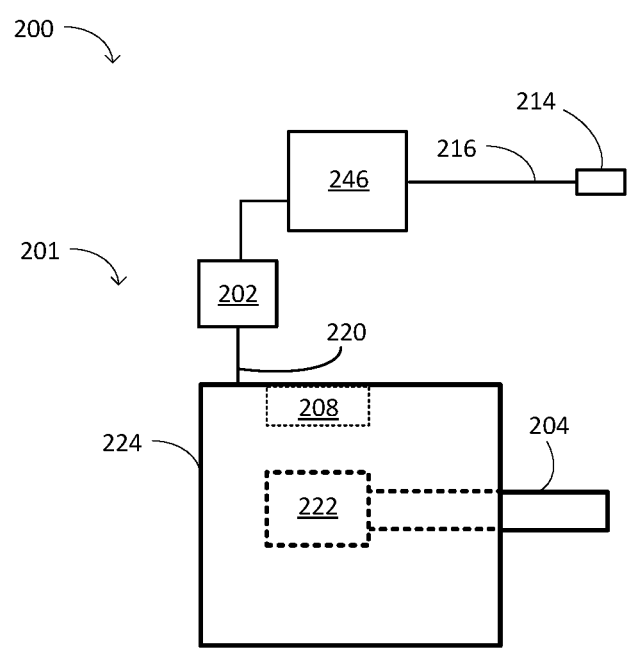
FIG. 2 is a block diagram illustrating an example of the system disclosed.

FIG. 2 illustrates a system 200 comprising electric machine 201, a rotary position sensor 214, and a rotary shaft 204. Electric machine 201 may be configured to operate as a motor, a generator or both a motor and a generator. When electric machine 201 is configured to operate as a motor, electrical power provided to electric machine 201 produces rotation of rotary shaft 204. When electric machine 201 is configured to operate as a generator, mechanical power provided to electric machine 201 via rotary shaft 204 generates electrical power from stator 208 or rotor 222. Rotor 222 is mechanically coupled to rotary shaft 204 such that a torque on rotor 22 is communicated to rotary shaft 204. In examples, rotor 222 and rotary shaft 204 are mechanically coupled so that a rotation of rotor 222 causes a corresponding rotation of rotary shaft 204, and vice-versa.

Rotary shaft 204 is configured to generate a torque based on a field. The field may emanate from stator 208 or rotor 222. Electric machine 201 further comprises a field winding configured to generate the field based on one or more electrical parameters such as a current, voltage, or current and voltage of the field winding. Electric machine 201 comprises a control circuit configured to control the one or more electrical parameters of the field winding. The field may be an electromagnetic field or a magnetic field, and the torque may be a motor torque when electric machine 201 is a motor, or a counter-torque when electric machine 201 is a generator.

For example, electric machine 201 may be a DC motor with one or more permanent magnets and/or rotor windings comprising rotor 222 of rotary shaft 204. The permanent magnets and/or rotor windings may be configured such that a rotor field emanating therefrom is stationary with respect to rotor 222. The permanent magnets and/or rotor windings may be configured such that a rotor field emanating therefrom follows a rotating stator field generated by stator 208.

Electric machine 201 may be configured to produce the rotating stator field through control of stator windings using electronic commutation, or some other method. In an example, electric machine 201 is configured to produce the rotating stator field by selectively controlling a voltage, current, or voltage and current to one or more stator windings based on a position of rotary shaft 204. The rotating stator field may consequently drive rotation of rotor 222, thereby generating a motor torque on rotary shaft 204 based on one or both of the rotating stator field of stator 208 and the rotor field of rotor 222. Control of the rotating stator field of stator 208 or the rotor field of rotor 222 through control of one or more electrical parameters of a field winding allows alteration of the motor torque generated by rotary shaft 204.

Electric machine 201 may be a DC motor with one or more permanent magnets and/or stator windings comprising stator 208, and a rotor field winding comprising rotor 222. Electric machine 201 may be configured to produce a stator field which is stationary with respect to stator 208. The rotor field winding may be configured to produce a rotor field which interacts with a stationary stator field produced by the one or more permanent magnets and/or stator windings comprising stator 208. Rotor 222 and the rotor field winding may be configured to generate a reversing rotor field using, for example, a commutator, such that the rotor field has a shifting polarity based on a rotary position of shaft 204. The interaction between the shifting rotor field and the stationary stator field drives rotation of rotor 222, thereby generating a motor torque on rotary shaft 204 based on one or both of the stationary stator field of stator 208 and the rotor field of rotor 222. Control of the stationary stator field of stator 208 or the rotor field of rotor 222 through control of one or more electrical parameters of a field winding allows alteration of the motor torque generated by rotary shaft 204.

Electric machine 201 may be a DC generator configured to generate a rotor field which is stationary with respect to rotary shaft 204 and provide DC power to an electrical load. Electrical machine 201 may be configured to receive rotary mechanical power via rotary shaft 204, causing rotation of rotary shaft 204 and the rotor field. Electric machine 201 may be configured such that the rotating rotor field interacts with the stator windings within stator 208, and generates a current and voltage in the stator field windings. Electric machine 201 may utilize the rotor field to generate AC electrical power on stator 208 and further comprise an AC/DC converter, to generate DC electrical power using the AC electrical power. Electric machine 201 may be configured such that the interaction between the rotor field and the stator generates a counter-torque on rotary shaft 204 acting in opposition to the mechanical power input. Control of the stator field of stator 208 (e.g., by control of the electrical power withdrawn from stator 208, which controls the stator field) or the rotor field of rotor 222 through control of one or more electrical parameters of a field winding allows alteration of the counter-torque generated by rotary shaft 204.

Electric machine 201 may be a DC generator receiving rotary mechanical power via rotary shaft 204 and causing rotor 222 to rotate in a stationary stator field generated by one or more permanent magnets and/or stator windings. Rotor 222 may comprise a rotor field winding which interacts with the stationary stator field emanating from stator 208, and generates a current, voltage, and rotor field in the rotor field winding. Correspondingly, the current within the rotor field winding as it interacts with the stationary stator field generates a counter-torque on rotary shaft 204 acting in opposition to the mechanical power input. The interaction between the rotor winding currents (which generate a rotor field) and the stator field thereby generates a torque on rotary shaft 204 based on the stationary stator field of stator 208. Control of the stator field of stator 208 or the rotor field of rotor 222 through control of one or more electrical parameters of a field winding allows alteration of the counter-torque generated by rotary shaft 204.

Electric machine 201 may be an AC generator configured to generate a rotor field which is stationary with respect to rotary shaft 204 and provide AC power to an electrical load. Electrical machine 201 may be configured to receive rotary mechanical power via rotary shaft 204, causing rotation of rotary shaft 204 and the rotor field. Electric machine 201 may be configured such that the rotating rotor field winding interacts with the stator windings within stator 208, and generates a current and voltage in the stator field windings. Electric machine 201 may be configured such that the interaction between the rotor field and the stator generates a counter-torque on rotary shaft 204 acting in opposition to the mechanical power input. Control of the stator field of stator 208 (e.g., by control of the electrical power withdrawn from stator 208, which controls the stator field) or the rotor field of rotor 222 through control of one or more electrical parameters of a field winding allows alteration of the counter-torque generated by rotary shaft 204.

Electric machine 201 may be any machine comprising a rotary shaft configured to generate a torque based on a field, a field winding configured to generate the field based on one or more electrical parameters of the field winding, and a control circuit configured to control the one or more electrical parameters of the field winding. Electric machine 201 may be configured to act as a motor receiving input electrical power to stator 208 and/or rotor 222 and providing output mechanical power via rotary shaft 204, and may be configured to act as a generator receiving input mechanical power to rotary shaft 204 and providing output electrical power via stator 208 or rotor 222. Electric machine 201 may receive either AC or DC input electrical power, and may provide either AC or DC output electrical power. Electric machine 201 may comprise stator field windings in stator 208, rotor field windings in rotor 222, one or more permanent magnets in stator 208, and/or one or more permanent magnets in rotor 222. Electric machine 201 may be a commutated machine comprising a commutator ring and brushes to control a rotor field, or may be electronically commutated to control the rotor field.

As discussed, the field winding comprising electric machine 201 is configured to generate the field which influences the rotary shaft and allows the rotary shaft to generate the torque. The field winding may comprise stator 208 or rotor 222. The field winding is configured to generate the field based on one or more electrical parameters of the field winding, such as a current, a voltage, or a current and voltage. The field winding may be provided with the one or more electrical parameters in order to generate a field based on the provided amount. For example, when electric machine 201 is a motor, the field winding may be provided with the one or more electrical parameters and generate a stator field or rotor field utilized by the rotary shaft to generate a motor torque. When electric machine 201 is a generator, the field winding may be provided with the one or more electrical parameters and generate a stator field or rotor field which causes the rotary shaft to generate a counter-torque.

In examples, the field winding is an electromagnet used to generate a magnetic field. The field winding may include a coil of wire through which a current flows. The coil of wires may be wound on a core comprising a metal such as iron which guides the field lines of the generated magnetic field. The field lines of the generated magnetic field may pass in a magnetic circuit from stator 208 and rotor 222. The field winding may be configured to generate a substantially constant, static field, or may be configured to generate a varying or intermittent field, to serve for example as part of a rotating field. The field winding may be a part of a delta or wye configuration.

Electric machine 201 further comprises a control circuit 202 configured to control the one or more electrical parameters of the field winding. Control circuit 202 may control a current, a voltage, or a current and voltage of the field winding. For example, control circuit 202 may control the one or more electrical parameters of the field winding to regulate a substantially uniform stator field. Control circuit 208 may control the one or more electrical parameters to cause the field winding to generate a stator field which cyclically alternates polarity, in order to create a rotating stator field. Control circuit 202 may control the one or more electrical parameters in order to regulate a substantially uniform rotor field. Control circuit 202 may control the one or more electrical parameters in order to alter a rotor field and rotor current to generate a field which cyclically alternates polarity based, for example, on the rotation of rotary shaft 204.

As illustrated at FIG. 2. System 200 further comprises a rotary position sensor 214. Rotary position sensor 214 is configured to sense the rotary position of a rotary component, where the rotary position is dependent on the rotation of rotary shaft 204. For example, the rotary component may sense a section of rotary shaft 204, or may be a shaft or gear within a gearbox driven by rotary shaft 204, or may be a shaft or gear driving rotary shaft 204. In some examples, rotary position sensor 214 is configured to sense the rotary position of rotary shaft 204. In some examples, rotary position sensor 214 is configured to communicate the rotary position of shaft 204 to an inverter comprising an electric machine configured to operate as a motor. In some examples, rotary position sensor 214 is configured to communicate the rotary position of shaft 204 to a rectifier comprising an electric machine configured to operate as a generator.

Here and elsewhere, when a rotary position is dependent on the rotation of rotary shaft 204, this means that system 200 is configured such that the rotary component providing the rotary position rotates in proportion with rotary shaft 204, regardless of whether the rotary component is transmitting a torque to rotary shaft 204 or receiving a torque from rotary shaft 204.

As an example, when electric machine 201 is electric motor 20 and rotary shaft 204 is shaft 40 (FIG. 1), and electric motor 20 is configured to produce mechanical power and transmit the mechanical power over shaft 40 to gearbox 22, when electric motor 20, shaft 40, and gearbox 22 are mechanically coupled such that a rotation of shaft 40 corresponds to a proportional rotation of a shaft or gear in gearbox 22, then a rotary position of the shaft or gear in gearbox 22 is dependent on the rotation of shaft 40. When gearbox 22 is mechanically coupled such that rotation of shaft 40 corresponds to a proportional rotation of shaft 42 (FIG. 1), the shaft 42 is dependent on the rotation of shaft 40. Similarly, when electric machine 201 is electric generator 16 and rotary shaft 204 is shaft 36 (FIG. 1), and gearbox 14 is configured to provide mechanical power over shaft 38 to electric generator 16, when gearbox 14, shaft 38, and electric generator 16 are mechanically coupled such that a rotation of shaft 38 corresponds to a proportional rotation of a shaft or gear in gearbox 14, then a rotary position of the shaft or gear in gearbox 14 is dependent on the rotation of shaft 38. When gearbox 22 is mechanically coupled such that rotation of shaft 38 corresponds to a proportional rotation of shaft 36 (FIG. 1), then shaft 36 is dependent on the rotation of shaft 38.

Rotary position sensor 214 may be any sensor which provides a rotary position of the rotary component. Rotary position sensor 214 may be a Hall effect sensor detecting the position of a permanent magnet on a rotary shaft. Rotary position sensor 214 may be a conductive, optical, or magnetic shaft encoder providing an analog or digital output signal indicative of a shaft position. Rotary position sensor may be an optical sensor such as a camera dedicated to observation of a specific rotating gear, a magnetic flux sensor dedicated to sensing the magnetic flux of the specific rotating gear, or other sensors.

System 200 further comprises a controller 246. Controller 246 may be a device such as a microcontroller configured to receive a signal indicative of the rotary position of the rotary component from rotary position sensor 214, via, for example, communication line 214. Controller 246 is configured to direct control circuit 202 to alter the electrical parameter of the field winding when controller 246 recognizes one or more specific rotary positions reported by rotary position sensor 214. As discussed, control circuit 202 is configured to control one or more electrical parameters of the field winding that generates the field rotary shaft 204 utilizes in order to develop a torque. Consequently, control of the field through control of the one or more electrical parameters of the field winding allows alteration of the motor torque or counter-torque generated by rotary shaft 204. This allows controller 246 to direct control circuit 202 to alter the one or more electrical parameters of the field winding—which alters the torque generated by rotary shaft 204—based on one or more specific rotary position of the rotary component monitored by rotary position sensor 214.

For example, when electric machine 201 is electric motor 20 configured to produce mechanical power and transmit a torque over shaft 40 to gearbox 22, and gearbox 22 is configured to transmit the torque to shaft 42 (FIG. 1), then controller 246 may direct a control circuit such as 202 to alter the one or more electrical parameters of the field winding within electric motor 20 as specific rotary positions are achieved by a rotary component dependent on shaft 40, such as an individual gear or shaft within gearbox 22, some portion of shaft 42, or some portion of shaft 40. This allows controller 246 to alter the motor torque generated by electric motor 20 and transmitted over shaft 40, gearbox 22, and shaft 42. When electric machine 201 is electric generator 16 and gearbox 14 is configured to transmit torque over shaft 38 to electric generator 16, and gearbox 14 is configured to transmit the torque from to shaft 36 (FIG. 1), then controller 246 may direct a control circuit such as 202 to alter the one or more electrical parameters of the field winding within electric generator 16 as specific rotary positions are achieved by a rotary component dependent on shaft 38, such as an individual gear or shaft within gearbox 16, some portion of shaft 36, or some portion of shaft 38. This allows controller 246 to alter the counter-torque generated by electric generator 16 and communicated to gearbox 16, shaft 38, and shaft 36.

In some examples, electric machine 201 is a synchronous machine where the rotational speed of rotary shaft 204 is proportional to a frequency of electrical power either received by electric machine 201 or produced by electric machine 201. Electric machine 201 may be a synchronous motor where the torque generated by rotary shaft 204 in response to a field causes rotation of rotary shaft 204 in proportion to a frequency of the electrical power producing the field. Electric machine 201 may be a synchronous generator where a frequency of electrical power produced by electric machine 201 is proportional to the rotation of rotary shaft 204. In some examples, electric machine 201 is a DC motor comprising one or more permanent magnets on rotor 222 and further comprising an inverter controlling a rotating field of stator 208, and rotary position sensor 214 provides a signal indicative of a rotary position of rotary shaft 204 to both the inverter and controller 246. In some examples, electric machine 201 comprises a generator producing AC electrical power on stator 208 and further comprises an AC/DC converter to generate DC electrical power using the AC electrical power, and rotary position sensor 214 provides a signal indicative of a rotary position of rotary shaft 204 to both the AC/DC converter and controller 246.

In some examples, when the rotary position sensor is configured to sense a rotary position of a rotary component, the disclosed system comprises a gear configured to rotate in proportion with the rotary component. In some examples, the gear is one among a plurality of gears in a gearbox, and the electric machine is configured to transmit a torque generated by its associated rotary shaft to the gearbox.

Figure 3:
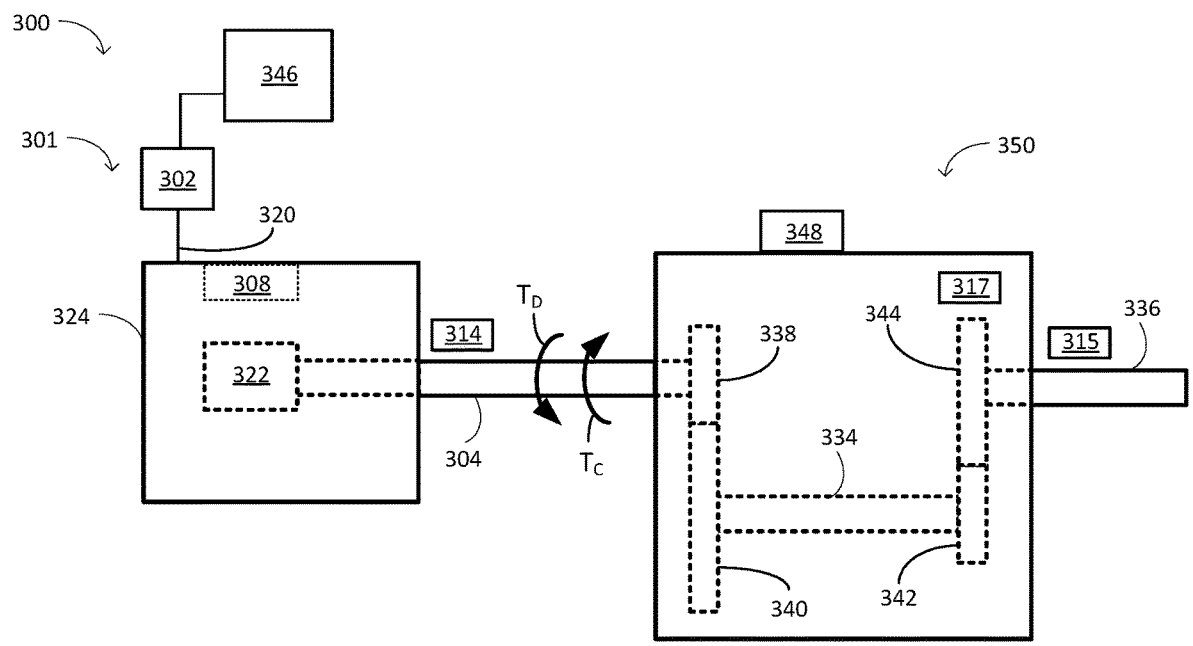
FIG. 3 illustrates an example electric machine and an example gearbox.

FIG. 3 illustrates a system 300 comprising electrical machine 301 mechanically coupled to an example gearbox 350. Electrical machine 301 comprises rotary shaft 304 configured to generate a torque based on a field, and a field winding configured to generate the field. Electric machine 301 may be configured to operate as a motor such that electrical power provided to stator 308 or rotor 322 (or both) produces a torque TD driving rotation of rotary shaft 304 and transmitted to gearbox 350 via rotary shaft 304. Alternately, electric machine 301 may be configured to operate as a generator receiving the torque TD from gearbox 350, and configured to generate electrical power while transmitting a counter-torque Tc over rotary shaft 304 to gearbox 22. Electric machine 301 also includes control circuit 302, electrical lead 320, rotary position sensor 314, and controller 346. Rotary shaft 304, housing 324, stator 308, rotor 322, control circuit 302, electrical lead 320, rotary position sensor 314, and controller 346 are configured to operate within electrical machine 301 similar to the operations discussed for rotary shaft 204, housing 224, stator 208, rotor 222, control circuit 202, electrical lead 220, rotary position sensor 214, and controller 246 within electrical machine 201 (FIG. 2).

Gearbox 350 comprises a gear configured to rotate in proportion with a rotary component, such as rotary shaft 304. Gearbox 350 includes gear 338 meshed with gear 340, and gear 342 meshed with gear 344. An internal shaft 334 mechanically couples and synchronizes the rotation of gear 340 and gear 342. Gear 344 is mechanically coupled with output shaft 336 such that the rotation of gear 344 and output shaft 336 are synchronized. In the example of FIG. 3, rotary shaft 304 of electrical machine 301 is mechanically coupled with gear 338 such that the rotation of rotary shaft 304 and gear 338 are synchronized. Due to the meshing of and mechanical coupling of the gears and shaft in gearbox 350, rotation of each of gear 338, gear 340, shaft 334, gear 344, and output shaft 336 is dependent on the rotation of rotary shaft 304. Additionally, each of rotary shaft 304, gear 338, gear 340, shaft 334, gear 344, and output shaft 336 rotates in proportion with any other of rotary shaft 304, gear 338, gear 340, shaft 334, gear 344, and output shaft 336.

Here and elsewhere, when a first component rotates in proportion to a second component, this means a rotation of the first component may be described based on a rotation of the second component and a proportionality constant, where the proportionality constant is independent of the rotational speed of the second component. For example, the first component might be gear 344 and the second component might be rotary shaft 304, and the proportionality constant might be determined based on the gear ratios among gears 338, 340, 342, and 344.

Consequently, for any component within the rotationally coupled components transmitting a torque (TD or Tc) from electric machine 301 to output shaft 336, a rotary position of the component may be ascertained from the rotary position of any of the rotationally coupled components and a corresponding proportionality constant. As a result, a rotary position sensor indicating a rotary position of any of the rotationally coupled components may be sufficient to anticipate the rotary position of every other rotationally coupled component transmitting the torque. For example, the rotary position of rotary shaft 304 indicated by rotary position sensor 314 is sufficient to anticipate the rotary position of any of rotary shaft 304, gear 338, gear 340, shaft 334, gear 344, and output shaft 336. Similarly, the rotary position of output shaft 306 indicated by rotary position sensor 315, and the rotary position of gear 344 indicated by rotary position sensor 317, are sufficient to anticipate the rotary position of any of rotary shaft 304, gear 338, gear 340, shaft 334, gear 344, and output shaft 336.

In some examples, when the disclosed system comprises a gear configured to rotate in proportion with a rotary component monitored by a rotary position sensor, controller 346 is configured to determine when a specific gear tooth is in a contact position. Controller 346 may make the determination based on a sensor dedicated to the individual gear and capable of sensing a gear tooth abnormality, such as one or more Hall Effect gear tooth sensors, variable reluctance sensors, magnetic sensors, or other gear tooth sensing devices. Controller 346 additionally or alternatively may make the determination based on a vibration monitoring system detecting vibrations of, for example, gearbox 350, or some other component to which vibrations of the gear may be transmitted. The vibration monitoring system may detect an unexpected vibration that occurs at a characteristic frequency indicating a contact position of a specific gear tooth. The specific gear tooth may be a gear tooth indicating an abnormality as compared to other gear teeth on the gear or within gearbox 350. Controller 346 may correlate the contact position of the specific gear tooth with the received signal indicative of the rotary position of a rotary component. Controller 346 may establish one or more specific rotary positions of the rotary component, and direct a control circuit such as control circuit 302 to alter the one or more electrical parameters of the field winding within electric generator machine 301 as the one or more specific rotary positions are achieved by the rotary component. In this manner, controller 346 may direct control circuit 302 to alter the torque of electric machine 301 when the specific gear tooth is in the contact position.

For example, controller 346 might determine a specific gear tooth of a gear within gearbox 350 is in a contact position based on an abnormal vibration sensed by vibration monitoring system 348. For example, vibration monitoring system 348 may report a cyclic occurrence of the abnormal vibration in the time domain to controller 346, and controller 346 may correlate the cyclic occurrence of the abnormal vibration with the rotary positions reported by the rotary position sensor, in order to determine the one or more specific rotary positions of a rotary component where the torque of electric machine 301 might be altered. For example, controller 346 may correlate the rotary positions of rotary position indicator 314 with the cyclic occurrence of the abnormal vibration to determine one or more specific rotary positions of shaft 304, and direct control circuit 302 to alter the torque of electric machine 301 when shaft 304 achieves the one or more rotary positions.

In some examples, control circuit 302 is configured to update the one or more parameters of the field windings at a first frequency, and the specific gear achieves a contact position at a second frequency, and the first frequency is greater than the second frequency. For example, control circuit 302 may command (i.e. update) a voltage, current, or voltage and current to a field winding at a frequency of about 8 khz by, for example, cycling one or more pulse width modulators (PWM). The specific gear tooth may be on a gear rotating at, for example, about 30,000 RPM, corresponding to a contact position of the specific gear tooth occurring at a frequency of about 0.5 khz. This relatively rapid control loop (operating at a first frequency of 8 khz) can be utilized to alter the torque to coincide with contact positions of the specific gear tooth (occurring at a second frequency of about 0.5 khz).

Figure 4:
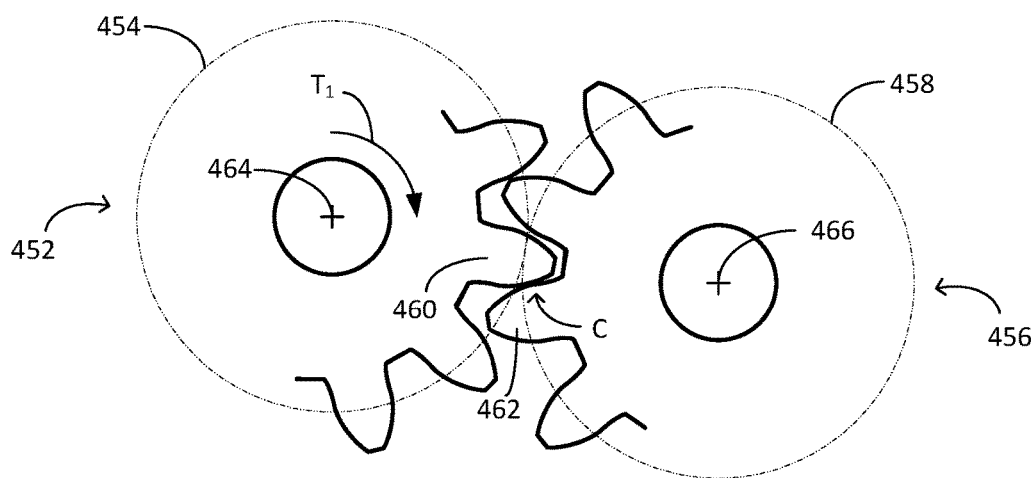
FIG. 4 illustrates an example meshing gear.

Here and elsewhere, a gear tooth in a contact position means a specific gear tooth on a specific gear when the specific gear tooth is in contact with one or more gear teeth on another gear meshing with the specific gear. The specific gear may be a driver, a follower, an idler, or any other meshing gear in a gear train. As an example, FIG. 4 illustrates a specific gear 452 having a gear center 464, a pitch circle 454, and specific tooth 460. Gear 452 bears a torque Ti around gear center 464 and rotates in proportion with a rotating component dependent on the rotary shaft of an electric machine, such as rotary shaft 204 (FIG. 2) or rotary shaft 304 (FIG. 3). Specific gear 452 is meshed with gear 456 having gear center 466, pitch circle 458, and gear tooth 462. Specific tooth 460 is in contact with one or more teeth on gear 456 such as tooth 462 at least at contact point C. As discussed, system 200 (FIG. 2) or system 300 (FIG. 3) may determine when, for example, specific gear tooth 460 is in a contact position using a sensor dedicated to specific gear 454 and capable of sensing a specific gear tooth, such as one or more Hall Effect gear tooth sensors, variable reluctance sensors, magnetic sensors, or other gear tooth sensing devices, or the determination may be based on a vibration monitoring system detecting vibrations emanating from a gear train comprising specific gear 454.

In some examples, a system includes an electric machine configured to communicate a torque to a gear. The electric machine may be configured to operate as a motor receiving electrical energy and generating a motor torque on a rotary shaft. The electric machine may be configured to operate as a generator receiving a mechanical torque on a rotary shaft and generating electrical power. The torque may be a motor torque when the electric machine is configured to operate as a motor and may be a counter-torque when the electric machine is configured to operate as a generator. The electric machine may communicate the torque to a gear which rotates in proportion with a rotary shaft of the electric machine. The gear may be part of a gearbox rotationally coupled with the rotary shaft of the electric machine.

The system may include a control circuit configured to control the torque of the electric machine. The control circuit may be configured to control the torque of the electric machine by controlling one or more electric parameters influencing a rotor field, a stator field, or both the rotor field and stator field of the electric machine. The control circuit may be configured to control the one or more electric parameters influencing the rotor field, the stator field, or both the rotor field and stator field based on a rotary position of the rotary shaft of the electric machine.

The system may include a controller configured to determine when a specific gear tooth of the gear is in a contact position. The controller may be configured to determine when the specific gear tooth is in a contact position based on indications from a sensor dedicated to the gear and capable of sensing the specific gear tooth, such as a Hall Effect gear tooth sensors, a variable reluctance sensor, a magnetic sensor, or another gear tooth sensing device. The controller may be configured to determine when the specific gear tooth is in a contact position based on indications from a vibration monitoring system detecting vibrations emanating from a gear train comprising the gear. The controller may direct the control circuit to alter the torque of the electric machine when the specific gear tooth is in the contact position.

The electric machine may be configured to operate as a motor and configured to deliver a motor torque to drive the gear, and the controller may be configured to decrease the torque when the gear is in the contact position. The electric machine may be configured to operate as a generator and configured to deliver a counter-torque to the gear, and the controller may be configured to increase the counter-torque when the gear is in the contact position.

A system such as system 200 or system 300 may be utilized to modulate torque in synchrony with a gear train or other rotary component for the purpose of intentionally adding increased stress to a specific gear tooth in a contact position, in order to stress test the gearbox. For example, the torque may be modulated to stress a specific gear tooth or a gear train for accelerated life testing or failure testing. High speed variations in torque from an electric machine such as 201 or 301 may be utilized to intentionally introduce vibrations into a gear train for the purpose of vibration testing, contaminate removal, or for some other reason where vibration introduction may be desired. High speed variations of torque from an electric machine such as 201 or 301 may be utilized for vibration testing of a component having an attachment to a gearbox through which generated vibrations may pass to the component, when vibration introduction to the component may be desired. For example, vibrations may be passed to a component for aeroelastic testing of a propeller or a static structure, deicing of a propeller, inertia testing, or some other reason.

A control circuit such as control circuit 202 (FIG. 2) or 302 (FIG. 3) may include any suitable arrangement of hardware, software, firmware, or any combination thereof, to perform the techniques attributed to the control circuits of this disclosure. A controller such as controller 246 (FIG. 2) or 346 (FIG. 3) may comprise any suitable arrangement of hardware, software, firmware, or any combination thereof, to perform the techniques attributed to the control circuits of this disclosure. A control circuit or controller may include any one or more microprocessors, digital signal processors (DSPs), application specific integrated circuits (ASICs), field programmable gate arrays (FPGAs), or any other equivalent integrated or discrete logic circuitry, as well as any combinations of such components. When a control circuit or controller includes software or firmware, the control circuit or controller further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. The control circuits or controllers may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to a control circuit or controller (e.g., may be external to a package in which the control circuit or controller is housed).

Figure 5:
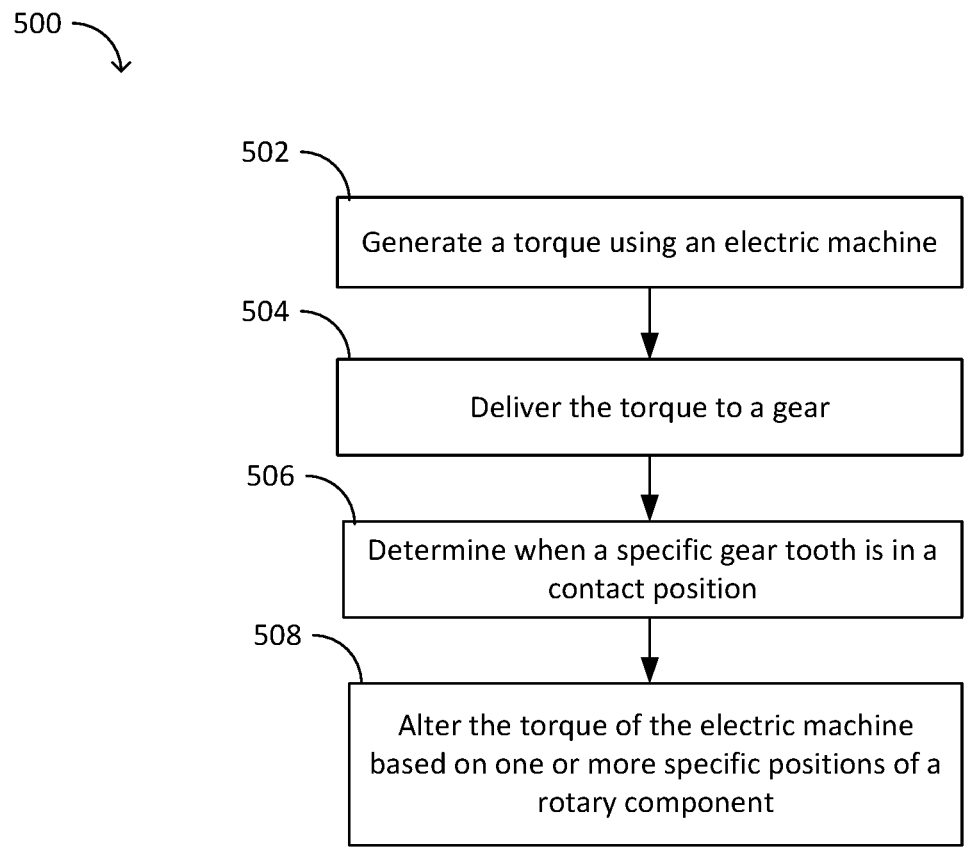
FIG. 5 illustrates an example method for using the system disclosed.

A method 500 of using the system of illustrated at FIG. 5. The method may include generating a torque using an electric machine (502). The electric machine may be controlled by a control circuit. The control circuit may control one or more electrical parameters of a field winding of the electric machine. The field winding may include a rotor of the electric machine and be configured to generate some portion of a rotor field of the electric machine. The field winding may include a stator of the electric machine and be configured to generate some portion of a stator field of the electric machine.

The method may include delivering the torque to a gear (504). The torque may be delivered via a rotation of a rotary shaft of the electric machine. The gear may be configured to rotate in proportion to the rotary shaft of the electric machine. The gear may comprise a meshing gear train comprising a plurality of gears configured to rotate in proportion of the rotary shaft of the electric machine. The electric machine may be configured to operate as a motor and the torque may be a motor torque. The electric machine may be configured to operate as a generator and the torque may be a counter-torque. The torque may cause a specific gear tooth of the gear to achieve a contact position with another gear.

The method may include determining when the specific gear tooth of the gear is in the contact position (506). The method may include determining when the specific gear tooth is in a contact position based on indications from a sensor dedicated to the gear such as a Hall Effect gear tooth sensor, a variable reluctance sensor, a magnetic sensor, or another gear tooth sensing device. The method may include determining when the specific gear tooth is in a contact position based on indications from a vibration monitoring system detecting vibrations emanating from a gear train comprising the gear.

The method may include correlating the contact position of the specific gear tooth with one or more specific rotary positions of a rotating component dependent on the rotation of the rotary shaft and rotating in proportion to the specific gear. The method may include altering the torque of the electric machine based on the one or more specific positions of the rotary component (508). The control circuit may be utilized to alter the one or more electric parameters of the field winding to alter the torque of the electric machine.

Various examples have been described. These and other examples are within the scope of the following claims.

The invention claimed is:

1. A system comprising:
    an electric machine comprising:
        a rotary shaft configured to generate a torque based on a field;
        a field winding configured to generate the field based on one or more electrical parameters of the field winding;
        a control circuit configured to control the one or more electrical parameters of the field winding;
        a rotary position sensor configured to sense a rotary position of a rotary component, wherein the rotary position is dependent on the rotation of the rotary shaft;
        a gear including a gear tooth, wherein the gear is configured to rotate in proportion with the rotary component; and
    a controller, wherein the controller is configured to:
        receive a signal indicative of the rotary position of the rotary component from the rotary position sensor;
        correlate a contact position of the gear tooth with the signal indicative of the rotary position of the rotary component; and
        direct the control circuit to alter the one or more electrical parameters of the field winding to alter the torque on the rotary shaft when the gear tooth is in the contact position, wherein the gear tooth is configured to contact a second gear when the gear tooth is in the contact position, and wherein the gear is configured to transfer at least some portion of the torque to the second gear through the gear tooth when the gear tooth is in the contact position.

2. The system of claim 1, wherein the electric machine is a synchronous machine.

3. The system of claim 2, wherein the electric machine is a motor and the rotary shaft is configured to generate a motor torque, and wherein the controller is configured to direct the control circuit to alter the one or more electrical parameters of the field winding to decrease the motor torque generated when the controller recognizes the one or more specific rotary positions of the rotary component.

4. The system of claim 2, wherein the electric machine is a generator and the rotary shaft is configured to generate a counter-torque, and wherein the controller is configured to alter the one or more electrical parameters of the field winding to increase the counter-torque generated when the controller when the controller recognizes the one or more specific rotary positions of the rotary component.

5. The system of claim 1 wherein the gear comprises a plurality of gears in a gearbox, and wherein the electric machine is configured to transmit the torque generated by the rotary shaft to the gearbox.

6. The system of claim 1, wherein the controller is configured to direct the control circuit to alter the one or more electrical parameters of the field winding when the control circuit controls the one or more electrical parameters of the field winding at a first frequency and the gear is in the contact position at a second frequency less than the first frequency.

7. The system of claim 1, wherein the controller is configured to determine when the specific gear tooth is in the contact position using the rotary position sensor.

8. The system of claim 1, wherein the electric machine is an electric motor and the rotary shaft is configured to generate a motor torque to drive the gear, and wherein the controller alters the one or more electrical parameters of the field winding to decrease the motor torque generated when the controller receives the signal indicative of the rotary position of the rotary component.

9. The system of claim 1, wherein the electric machine is a generator and the rotary shaft is configured to generate a counter-torque and communicate the counter-torque to the gear, and wherein the controller alters the one or more electrical parameters of the field winding to decrease the counter-torque generated when the controller receives the signal indicative of the rotary position of the rotary component.

10. The system of claim 1, wherein the controller is configured to determine when the gear tooth of the gear is in a contact position by sensing a vibration of the gear and correlating the vibration of the gear with the signal indicative of the rotary position of the rotary component.

11. A system comprising:
an electric machine configured to communicate a torque to a gear;
a control circuit configured to control the torque of the electric machine; and
a controller, wherein the controller is configured to:
determine when a specific gear tooth of the gear is in a contact position;
correlate the contact position of the specific gear tooth with one or more rotary positions of a rotary component rotating in proportion with the specific gear; and
direct the control circuit to alter the torque of the electric machine when the rotary component achieves the one of more specific rotary positions, wherein the specific gear tooth is configured to contact a second gear when the specific gear tooth is in the contact position, and wherein the gear is configured to transfer at least some portion of the torque to the second gear through the specific gear tooth when the specific gear tooth is in the contact position.

12. The system of claim 11, wherein the electric machine is a motor configured to deliver a motor torque to drive the gear, and the controller is configured to decrease the torque when the gear is in the contact position.

13. The system of claim 11, wherein the electric machine is a generator configured to deliver a counter-torque to the gear, and wherein the controller is configured to increase the counter-torque when the gear is in the contact position.

14. The system of claim 11, further comprising a rotary position sensor,
wherein the electric machine comprises a rotary shaft,
wherein the rotary position sensor is configured to sense a rotary position of the rotary component, wherein the rotary position is dependent on the rotation of the rotary shaft, and
wherein the controller is in communication with the rotary position sensor.

15. The system of claim 14, wherein the controller is configured to determine when the specific gear tooth of the gear is in the contact position by sensing a vibration and correlating the vibration with the rotary position of the rotary component.

16. A method comprising:
generating a torque using an electric machine controlled by a control circuit controlling one or more electrical parameters of a field winding of the electric machine;
delivering the torque to a gear using a rotation of a rotary shaft of the electric machine;
causing a specific gear tooth of the gear to achieve a contact position with another gear using the delivered torque;
determining when the specific gear tooth of the gear is in the contact position;
correlating the contact position of the specific gear tooth with one or more specific rotary positions of a rotating component dependent on the rotation of the rotary shaft and rotating in proportion to the specific gear; and
altering the torque of the electric machine using the control circuit to alter the one or more electric parameters of the field winding when the rotating component achieves the one or more specific rotary positions, wherein the specific gear tooth is configured to contact a second gear when the specific gear tooth is in the contact position, and wherein the gear is configured to transfer at least some portion of the torque to the second gear through the specific gear tooth when the specific gear tooth is in the contact position.

17. The method of claim 16, wherein generating the torque comprises operating the electric machine as a motor and generating a motor torque.

18. The method of claim 16, wherein generating the torque comprises operating the electric machine as a generator and generating a counter-torque.

19. The system of claim 1, wherein: the gear tooth is configured to decrease the at least some portion of the generated torque transferred to the second gear when the controller directs the control circuit to alter the one or more electrical parameters of the field winding to decrease the torque on the rotary shaft, and the gear tooth is configured to increase the at least some portion of the generated torque transferred to the second gear when the controller directs the control circuit to alter the one or more electrical parameters of the field winding to increase the torque on the rotary shaft.

* * * * *